United States Patent Office 2,953,581
Patented Sept. 20, 1960

2,953,581

3-OXYGENATED-20-KETO-21-FLUORO-PREGNANES

Elwood V. Jensen, Chicago, Ill., assignor to Research Corporation, New York, N.Y., a corporation of New York No Drawing. Filed Apr. 2, 1956, Ser. No. 575,354

4 Claims. (Cl. 260—397.3)

This invention relates to novel steroid compounds of high anti-inflammatory activity and to a process for their production and is more particularly concerned with the production of 3-oxygenated-20-keto-21-fluoropregnane compounds.

The term "pregnane compounds" is here used generically and includes those compounds having the pregnane carbon skeleton which have double bonds, especially in positions 4, e.g., progesterone, and 5, e.g., pregnenolone, and which moreover can possess additional hydroxy or acyloxy groups, for example, in positions 11, 14, 17, or the like, or keto groups, especially in position 11.

The compounds and process of the invention may be illustratively represented by the formulae:

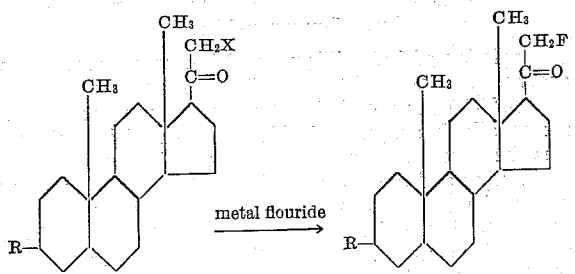

wherein X is chlorine, bromine or iodine and wherein R is selected from the group consisting of α- and β-hydroxy, α- and β-acyloxy in which the acyl radical is of an organic carboxylic acid, preferably a hydrocarbon carboxylic acid containing from one to eight carbon atoms, inclusive, and keto.

The process comprises reacting the selected 3-oxygenated-20-keto-21-halopregnane wherein the halogen is of atomic number between 17 and 53, inclusive, with a metal fluoride known in the art as fluorinating agents, such as silver fluoride, mercurous and mercuric fluoride, thallous fluoride, antimony trifluoride, the latter preferably in the presence of pentavalent antimony fluorochloride or hydrogen fluoride, potassium fluoride, and the like, with silver fluoride preferred.

It is an object of the invention to provide 3-oxygenated-20-keto-21-fluoropregnanes of high anti-inflammatory activity. It is a particular object of the invention to provide the 3-oxygenated-20-keto-21-fluoropregnane compounds of the group consisting of 3β-hydroxy-21-fluoro-5-pregnen-20-one, 3β-acyloxy-21-fluoro-5-pregnen-20-one wherein the acyl radical is of a hydrocarbon carboxylic acid containing from one to eight carbon atoms, 21-fluoroprogesterone, 11β-hydroxy-21-fluoroprogesterone, 17α-hydroxy-21-fluoro-4-pregnene-3,11,20-trione, and 11β,17α-dihydroxy-21-fluoro-4-pregnene-3,20-dione. It is another object of the invention to provide a method for the production of such 3-oxygenated-21-fluoropregnene compounds. Other objects of the invention will be apparent to those skilled in the art to which the invention pertains.

The starting materials of the invention are 3-oxygenated-20-keto-21-halopregnanes wherein the halogen is chloro, bromo, or iodo. Such compounds are well known in the art and have been produced by either (1) introducing directly a halogen into the 21-methyl group of a 20-ketopregnane compound, for example, by direct bromination of the 20-ketopregnane [cf. Kritchevsky et al., J. Am. Chem. Soc., 74, 483 (1952)], (2) by oxalation of the 21-methyl group and treatment of the thus-produced alkali-metal enolate of the 21-alkoxyoxalyl-20-ketopregnane with iodine [U.S. 2,725,905], or (3) by the action of organic sulfonyl halides on the 21-hydroxyl group of a 21-hydroxypregnane [cf. Reichstein et al., Acta Helv. Chim., 23, 684 (1940)]. Using benzenesulfonyl chloride and toluenesulfonyl chloride on a 20-keto-21-hydroxypregnane compound produces in general a mixture containing the 21-chloro-20-ketopregnane as well as the sulfonyl ester of the 21-hydroxy-20-ketopregnane. Similarly using the corresponding arylsulfonyl bromides such as toluenesulfonyl bromide, produces a mixture containing the 21-bromo- as well as the 21-toluenesulfonate of the 20-keto-21-hydroxypregnane. Such mixtures, however, are easily separable and the corresponding 20-keto-21-chloro- and 20-keto-21-bromopregnanes can be obtained in the pure form. Since the 21-iodopregnanes are convertible more easily and in higher yields to the 21-fluoropregnanes, the thus-produced 21-chloro- and 21-bromo-20-ketopregnanes are preferably converted to the 21-iodo analogs by an exchange reaction with sodium or potassium iodide in acetone. Better yields have been obtained by reacting a 20-keto-21-hydroxypregnane with methanesulfonyl chloride and converting the 21-methanesulfonate of 20-keto-21-hydroxypregnane with sodium or potassium iodide in acetone to the corresponding 20-keto-21-iodopregnane compound (as is more fully described in Preparations 1 through 4).

In carrying out the process of the invention, the selected 3-oxygenated-20-keto-21-halopregnane wherein the halo group is chloro, bromo, or iodo, is reacted with a metal fluoride such as silver fluoride, mercurous or mercuric fluoride, antimony fluoride, usually in the presence of a pentavalent antimony fluorochloride or in the presence of hydrogen fluoride, potassium fluoride, thallous fluoride, or the like. Silver fluoride is the preferred fluoride for the preparation of the fluoro compounds. The silver fluoride used may be either in dry form or as readily available commerically in fifty percent aqueous silver fluoride solution. In aqueous solution silver fluoride seems to be more stable than in the dry form which usually contains large amounts of impurities from reduction as shown by the discoloration of the commercially available products. The amount of metal fluoride used in the fluorination is usually equal to or greater than the stoichiometrically required amount. In case of silver fluoride the stoichiometric amount is two moles of silver fluoride per mole of steroid since the silver iodide formed in the reaction forms an addition compound with the silver fluoride present. In the preferred embodiment of the invention an excess of ten to forty percent of silver fluoride above the stoichiometric required amount is used. Larger or lesser amounts may be used and are also operative but present no advantages. The reaction is carried out in solution in hydrocarbon carboxylic acid nitriles, for example, acetonitrile, propionitrile, butyronitrile, or the like, alcohols, especially tertiary alcohols, such as tertiary butyl alcohol, tertiary amyl alcohol, hydrocarbons such as normal hexane, normal heptane, benzene or the like, dioxane, ethylether, or the like. With silver fluoride in aqueous solution (fifty percent), acetonitrile has been found superior to other solvents. Any tendency of the silver fluoride to precipitate may be prevented by the addition of a small amount of water to the system. Temperatures at which the reaction may be carried out are between minus ten and plus eighty degrees centigrade and in the preferred embodiment of the invention using silver fluoride as the reagent and acetonitrile as the solvent a temperature between zero and fifty degrees is preferred. After the reaction has been terminated, the product is separated by conventional procedures such as filtration, extraction, or the like, and purified by recrystallization or chromatography, as deemed necessary.

The following examples are illustrative of the process and products of the present invention, but are not to be construed as limiting:

PREPARATION 1.—21-IODOPROGESTERONE 21-iodoprogesterone has been prepared from progesterone by the method of Nathan and Hogg, U.S. 2,727,905. The present preparation starts from available desoxycorticosterone and is as follows:

A solution of four grams of desoxycorticosterone, 1.38 milliliters of methanesulfonyl chloride and eighteen milliliters of dry pyridine was allowed to stand at zero degrees centigrade for a period of two hours. Water was then added, and the precipitated steroid was collected on a filter and dried. Recrystallization of the product from acetone gave desoxycorticosterone methanesulfonate, in 44 percent yield (2.16 grams) of melting point 156–157° C.

For purposes of producing the 21-iodoprogesterone, it was found advantageous not to purify the 21-methanesulfonate highly, but to treat the crude reaction product with sodium iodide and purify the iodo compound instead.

A mixture of 700 milligrams of desoxycorticosterone methanesulfonate, 815 milligrams of sodium iodide and 25 milliliters of acetone was heated to reflux for a period of thirty minutes, whereupon the reaction mixture became thick and gelatinous. After cooling, water was added slowly, and the precipitated steroid was collected on a filter and dried to yield crude 21-iodoprogesterone, 610 milligrams (94 percent yield) of melting point 118–120° C. with decomposition. Recrystallization of the crude material from methanol furnished an analytical sample of 21-iodoprogesterone of melting point 109–110° C.

*Analysis.*—Calcd. for $C_{21}H_{29}O_2I$: C, 57.27; H, 6.64; I, 28.82. Found: C, 57.11; H, 6.58; I, 28.72.

PREPARATION 2.—17α-HYDROXY-21-IODO-4-PREGNENE-3,11,20-TRIONE 1.08 gram of cortisone was treated with 0.51 gram of methanesulfonyl chloride in ten milliliters of pyridine at zero degrees in the manner described in Preparation 1. After recrystallization from acetone, 930 milligrams (71 percent yield) of cortisone methanesulfonate of melting point 196–198° C. were obtained. A more highly purified sample of cortisone methanesulfonate melted at 198–199° C.

A mixture of 920 milligrams of cortisone methanesulfonate, 634 milligrams of sodium iodide and twelve milliliters of acetone was heated under reflux for a period of ten minutes. After cooling, water was added slowly and the precipitated steroid was collected on a filter, washed with water and dried, to give 880 milligrams of crude 17α - hydroxy - 21 - iodo - 4 - pregnene - 3,11,20 - trione. The crude material when recrystallized from acetone gave 17α-hydroxy-21-iodo-4-pregnene-3,11,20-trione of a decomposition point of 170° C.

PREPARATION 3

In the same manner as shown in Preparations 1 and 2, reacting at zero degrees centigrade in pyridine solution with methanesulfonyl chloride (a) 11-dehydrocorticosterone gave 11-dehydrocorticosterone 21-methanesulfonate.

(b) Corticosterone gave corticosterone 21-methanesulfonate.

PREPARATION 4

Heating as shown in Preparations 1 and 2 with sodium iodide in acetone (a) 11 - dehydrocorticosterone 21 - methanesulfonate yielded 21-iodo-11-ketoprogesterone (21-iodo-4-pregnene 3,11,20-trione).

(b) Corticosterone 21-methanesulfonate gave 11β-hydroxy-21-iodo-4-pregnene-3,20-dione.

*Example 1.—21-fluoropregnenolone acetate (3-acetoxy-21-fluoro-5-pregnen-20-one)*

A solution was prepared containing 737 milligrams of 21-iodopregnenolone acetate of melting point 132–134° C. in fifty milliliters of acetonitrile. To this solution was added one milliliter of fifty percent silver fluoride solution in portions under continuous stirring. The reaction mixture was allowed to stand at room temperature (20–30° C.) for a period of twenty hours and then the precipitated material, which was first yellow but later turned black, was removed by filtration. The filtrate was evaporated in an air stream, the residue was dissolved in benzene, and this solution filtered to remove traces of inorganic material. The benzene was evaporated leaving 629 milligrams of crude 21-fluoropregnenolone acetate which after repeated recrystallization from methanol gave pure 21-fluoropregnenolone acetate of melting point 155–156° C. and a rotation $[\alpha]_D^{25}$ plus 32 degrees (concentration 0.50 grams of 21-fluoropregnenolone acetate in 100 milliliters of chloroform).

*Example 2.—21-fluoropregnenolone (3β-hydroxy-21-fluoro-5-pregnen-20-one)*

A solution of 239 milligrams of 21-fluoropregnenolone acetate was allowed to stand at room temperature (20–25° C.) for a period of twenty hours in one percent methanolic hydrogen chloride solution. The mixture was thereupon evaporation to dryness, the residue taken up in ether and the ether solution was washed with water and sodium bicarbonate solution, dried over anhydrous sodium sulfate and decolorized with Norit (decolorizing activated charcoal). Evaporation of the ether solution yielded crude 21-fluoropregnenolone in 85 percent yield which after recrystallization from methanol and ether had a melting point of 178.5–179.5° C. and a rotation $[\alpha]_D^{25}$ plus 25 degrees (in chloroform).

*Example 3.—21-fluoropregnenolone propionate*

A solution of 100 milligrams of 21-fluoropregnenolone in one milliliter of pyridine was reacted with one milliliter of propionic anhydride. The mixture was allowed to stand at room temperature for one day and was thereafter poured into ten milliliters of ice water. The precipitated 21-fluoropregnenolone was recovered by filtration, the precipitate was recrystallized from a mixture of methanol and ether to give pure 21-fluoropregnenolone propionate.

*Example 4.—21-fluoropregnenolone benzoate*

To a solution of 100 milligrams of 21-fluoropregnenolone in one milliliter of pyridine was added one milliliter of benzoyl chloride. The mixture was allowed to stand at room temperature for a period of 24 hours and was thereafter poured into twenty milliliters of ice water, the ice water solution was extracted with methylene chloride, the extract evaporated and the residue repeatedly recrystallized from methanol to give pure 21-fluoropregnenolone benzoate.

*Example 5*

In the same manner as shown in Examples 3 or 4, reacting 21-fluoropregnenolone in pyridine solution with (a) Butyric anhydride yielded 21-fluoropregnenolone butyrate.

(b) Valeric anhydride yielded 21-fluoropregnenolone valerate.

(c) Hexanoyl chloride yielded 21-fluoropregnenolone hexanoate.

(d) Heptanoyl bromide yielded 21-fluoropregnenolone heptanoate.

(e) Octanoyl chloride yielded 21-fluoropregnenolone octanoate.

(f) Phenylacetyl chloride yielded 21-fluoropregnenolone phenylacetate.

(g) Phenylpropionyl bromide yielded 21-fluoropregnenolone phenylpropionate.

(h) Toluyl chloride yielded 21-fluoropregnenolone toluate.

(i) Anisoyl chloride yielded 21-fluoropregnenolone anisate.

(j) β-cyclopentylpropionyl bromide yielded 21-fluoropregnenolone β-cyclopentylpropionate.

In the same manner as shown in Examples 3 through 5, other esters of 21-fluoropregnenolone are prepared by reacting 21-fluoropregnenolone in pyridine solution with the chloride or anhydride of a hydrocarbon carboxylic acid. Representative esters of 21-fluoropregnenolone thus prepared include the acid tartrate, acid succinate, acid maleate, dihydrogencitrate, salicylate, cinnamate, trimethylacetate, triethylacetate, or the like.

*Example 6.—21-fluoroprogesterone*

A solution of 250 milligrams of 21-iodoprogesterone of melting point 118 to 120 in fifteen milliliters of acetonitrile was treated with 0.5 milliliter of silver fluoride solution (fifty percent) with stirring for twenty hours at room temperature (20–30° C.). After filtration of the precipitate the solvent was evaporated and the residue taken up in methanol and filtered again. Evaporation of the methanol yielded 212 milligrams of crude product of melting point 110–116° C. The crude product was recrystallized from methanol and thereupon twice from heptane to yield 21-fluoroprogesterone of melting point 141.5–142.5° C.

In an improved procedure 920 milligrams of 21-iodoprogesterone was dissolved in fifty milliliters of acetonitrile and thereto was added two milliliters of silver fluoride solution (fifty percent aqueous solution) in four equal portions over a period of three hours while the reaction mixture was stirred at forty degrees centigrade. The reaction mixture was then evaporated to dryness under reduced pressure, and the residue was extracted three times with boiling normal heptane. The heptane extracts were concentrated to give 580 milligrams of crude product of melting point 127–130° C., which upon recrystallization from heptane gave 437 milligrams (63 percent yield) of the 21-fluoroprogesterone of melting point 133–135° C. The 21-fluoroprogesterone has a high anti-inflammatory activity with low salt retention and low glucocorticoid activity. It has a higher progestational activity than progesterone when administered subcutaneously and also has a very high oral progestational activity. It is also an effective inhibitor of estrone activity.

*Example 7.—17α-hydroxy-21-fluoro-4-pregnene-3,11,20-trione*

A solution of 390 milligrams of 17-hydroxy-21-iodo-4-pregnene-3,11,20-trione, dissolved in forty milliliters of acetonitrile, was treated with one milliliter of fifty percent silver fluoride solution and allowed to stand at room temperature for fifteen hours. Thereafter an additional 0.2 milliliter of silver fluoride was added and the mixture was stirred at room temperature for a period of four hours. The reaction mixture was thereupon evaporated to dryness and the residue was extracted with boiling acetone. Evaporation of the acetone yielded 454 milligrams of crude product which after repeated recrystallization from acetone and methanol furnished pure 17α-hydroxy-21-fluoro-4-pregnene-3,11,20-trione of melting point 249–252° C.

*Example 8.—3α,17α-dihydroxy-21-fluoropregnane-11,20-dione and 17α-hydroxy-21-fluoropregnane-3,11,20-trione*

In the same manner as shown in Example 1, 3α,17α-dihydroxy-21-bromopregnane-11,20-dione [Kritchevsky et al., J. Am. Chem. Soc., 74, 484 (1952)], dissolved in acetonitrile, was reacted with silver fluoride and the mixture agitated for a period of 24 hours under continuous stirring. The reaction mixture was thereupon filtered and the filtrate evaporated to give a residue which upon recrystallization from methanol gave 3α,17α-dihydroxy-21-fluoropregnane-11,20-dione.

In the same manner given in Example 1, 17α-hydroxy-21-bromopregnane-3,11,20-trione [Kritchevsky et al., J. Am. Chem. Soc., 74, 484 (1952)] was reacted with silver fluoride in tertiary butyl alcohol to give 17α-hydroxy-21-fluoro-pregnane-3,11,20-trione.

*Example 9.—21-fluoro-4-pregnene-3,11,20-trione*

In the same manner as shown in Example 1, 21-iodo-4-pregnene-3,11,20-trione, dissolved in dioxane, was treated with thallous fluoride for a period of 48 hours to yield 21-fluoro-4-pregnene-3,11,20-trione.

*Example 10.—11β,17α-dihydroxy-21-fluoro-4-pregnene-3,20-dione*

In the same manner given in Example 1, treating 11β,17α-dihydroxy-21-iodo-4-pregnene-3,20-dione [Clarence G. Bergstrom, U.S. 2,713,587] with silver fluoride in acetonitrile solution produced 11β,17α-dihydroxy-21-fluoro-4-pregnene-3,20-dione, melting point, 240–242° C.

Instead of the iodo compounds the corresponding chloro compounds and bromo compounds, 11β,17α-dihydroxy-21-chloro-4-pregnene-3,20-dione and 11β,17α-dihydroxy-21-bromo-4-pregnene-3,20-dione [Bergstrom, ibid.], can be used for the exchange reaction with silver fluoride.

*Example 11.—21-fluoro-4-pregnene-3,11,20-trione*

In the same manner given in Example 1, treating 21-iodo-11-ketoprogesterone with mercuric fluoride in tertiary amyl alcohol at fifty degrees centigrade for a period of 24 hours produced 21-fluoro-4-pregnene-3,11,20-trione.

*Example 12.—11β-hydroxy-21-fluoro-4-pregnene-3,20-dione*

In the same manner given in Example 1, treating 11β-hydroxy-21-iodoprogesterone, dissolved in acetronitrile, with silver fluoride produced 11β-hydroxy-21-fluoroprogesterone (11β-hydroxy-21-fluoro-4-pregnene-3,20-dione), melting point 207–208° C.

In the same manner as described in Examples 1–12, reacting other available 3-oxygenated-20-keto-21-halopregnanes wherein the halo atom is chlorine, bromine, or iodine with a metal fluoride, preferably silver fluoride, in a suitable solvent, preferably acetonitrile produces other 3-oxygenated-20-keto-21-fluoropregnanes. Representative compounds thus prepared include: 17α-hydroxy-21-fluoro-4-pregnene-3,11,20-trione and 17α-hydroxy-21-fluoropregnane-3,11,20-trione [from the corresponding 21-bromo analogues Mm. L. Velluz et al., Bull. Soc. Chim. de France, page 906 (1953)], 3α,17α-dihydroxy-21-fluoropregnane-3,20-dione 3α-monoacetate, 16,17-oxido-21-fluoropregnane-3,11,20-trione, 3α-hydroxy-16,17-oxido-21-fluoropregnane-11,20-dione and the like.

The anti-inflammatory activity of the compounds of the invention may be utilized by administration in the forms and by the procedures commonly used in the administration of adrenocortical steroids.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:
1. 3-oxygenated-20-keto-21-fluoropregnane compounds of the group consisting of 3β-hydroxy-21-fluoro-5-pregnen-20-one, 3β-acyloxy-21-fluoro-5-pregnen-20-one wherein the acyl radical is of a hydrocarbon carboxylic acid containing from one to eight carbon atoms, inclusive, 21-fluoroprogesterone, and 11β,17α-dihydroxy-21-fluoro-4-pregnene-3,20-dione.
2. 3β-acetoxy-21-fluoro-5-pregnen-20-one.
3. 21-fluoroprogesterone.
4. 11β,17α-dihydroxy-21-fluoro-4-pregnene-3,20-dione.

References Cited in the file of this patent
UNITED STATES PATENTS

| | | |
|---|---|---|
| 2,268,084 | Reichstein | Dec. 30, 1941 |
| 2,554,472 | Ruschig | May 22, 1951 |
| 2,684,968 | Bergstrom | July 27, 1954 |
| 2,734,065 | Hogg | Feb. 7, 1956 |